(12) United States Patent
Zimmermann et al.

(10) Patent No.: US 7,575,216 B2
(45) Date of Patent: Aug. 18, 2009

(54) ELASTIC LOOP FOR SUSPENDING THE EXHAUST SYSTEM OF A MOTOR VEHICLE

(75) Inventors: Horst Zimmermann, Kaufungen (DE); Stefan Schweinsberg, Lohfelden (DE)

(73) Assignee: WEGU GmbH & Co. KG, Kassel (DE)

( * ) Notice: Subject to any disclaimer, the term of this patent is extended or adjusted under 35 U.S.C. 154(b) by 504 days.

(21) Appl. No.: 11/445,012

(22) Filed: Jun. 1, 2006

(65) Prior Publication Data

US 2006/0213422 A1    Sep. 28, 2006

(30) Foreign Application Priority Data

Jun. 3, 2005    (DE) ................. 20 2005 008 665 U

(51) Int. Cl.
*F16M 13/00*    (2006.01)

(52) U.S. Cl. .......................... 248/610; 248/60

(58) Field of Classification Search ......... 248/610–613, 248/560, 634, 635, 58, 60
See application file for complete search history.

(56) References Cited

U.S. PATENT DOCUMENTS

| | | | | |
|---|---|---|---|---|
| 4,415,391 A | * | 11/1983 | Reid | 156/187 |
| 5,082,252 A | * | 1/1992 | Miyamoto | 267/140.13 |
| 5,435,532 A | | 7/1995 | Ihle et al. | 267/153 |
| 5,575,461 A | * | 11/1996 | Ihle | 267/153 |
| 5,829,732 A | * | 11/1998 | Yamaguchi et al. | 248/610 |
| 6,264,164 B1 | * | 7/2001 | Steinmaier | 248/610 |
| 6,402,119 B1 | * | 6/2002 | Miska | 248/613 |

FOREIGN PATENT DOCUMENTS

| | | |
|---|---|---|
| DE | 26 58 358 | 6/1978 |
| DE | 42 11 397 | 3/1993 |
| DE | 295 06 970 | 6/1995 |
| DE | 295 06 970 | 8/1995 |
| DE | 198 12 347 | 10/1999 |
| DE | 199 06 548 | 5/2000 |

* cited by examiner

*Primary Examiner*—Korie H. Chan
(74) *Attorney, Agent, or Firm*—Thomas, Kayden, Horstemeyer and Risley, LLP

(57) ABSTRACT

An elastic loop 1 is provided for suspending an exhaust system of a motor vehicle at a vehicle floor of the motor vehicle. The elastic loop 1 has a basic body 4 made of an elastomeric material 5, the basic body 4 enclosing two receiving eyes 6 and 7, one of which being provided for receiving a supporting part, and the other of which being provided for receiving a part to be supported, and the basic body 4 comprising at least two elastic supporting bands 8 and 9 which run from the one receiving eye 6 to the other receiving eye 7 in a main plane of extension and operation of the loop. Further, the elastic loop 1 has a ring 21 enclosing the basic body 4 in the main plane, the ring 21 being a pre-cut piece 24 of a ribbon 20 which is continuously woven in consecutive one-layer and two-layer areas, i.e. once in a single closed layer and once in two separate layers, the pre-cut piece 24 including an entire two-layer area and at least parts of both adjacent one-layer areas.

10 Claims, 3 Drawing Sheets

ELASTIC LOOP FOR SUSPENDING THE EXHAUST SYSTEM OF A MOTOR VEHICLE

CROSS REFERENCE TO RELATED APPLICATIONS

This application claims priority to co-pending German Utility Model Application No. DE 20 2005 008 665.7 entitled "Elastische Schlaufe, insbesondere zur Aufhängung der Abgasanlage eines Kraftfahrzeugs" (Elastic loop for suspending the exhaust system of a motor vehicle), filed Jun. 3, 2005.

FIELD OF THE INVENTION

The present invention relates to an elastic loop for suspending an exhaust system of a motor vehicle at a vehicle floor of the motor vehicle, the elastic loop having a basic body made of an elastomeric material, the basic body enclosing two receiving eyes, one of which being provided for receiving a supporting part, and the other of which being provided for receiving a part to be supported, and the basic body comprising at least two elastic supporting bands which run from the one receiving eye to the other receiving eye in a main plane of extension and operation of the loop, and a ring made of a tear-resistant ribbon enclosing the basic body in the main plane and serving as a loss safety.

PRIOR ART

An elastic loop for suspending an exhaust system of a motor vehicle at a vehicle floor of the motor vehicle is known from German Utility Model DE 295 06 970 U1. Besides two supporting bands running in a main plane of extension and operation of the loop from one receiving eye to the other, this loop has a loss safety as a further connection of the receiving eyes, which is a closed ring made of a tear-resistant ribbon. This loss safety encloses the basic body made of elastomeric material, which forms the receiving eyes and the supporting bands. The inner circumference of the loss safety is bigger than the outer circumference of the basic body in the unloaded state of the elastic loop. Thus, the known elastic loop has a two stage spring characteristic, the first stage of which ends, when the basic body is loaded to such an extent that its outer circumference is as big as the inner circumference of the loss safety so that the loss safety abuts against the outer circumference of the basic body. In this way, the elastic loop can be kept comparatively soft without affecting the safety in suspending an exhaust system of a motor vehicle at the vehicle floor.

In the actual embodiment of the elastic loop known from DE 295 06 970 U1 the ends of a pre-cut piece of the tear-resistant ribbon are sewn together to make the closed ring of the tear-resistant ribbon for the loss safety.

Both published German Patent Application DE 26 58 358 A1 and German Patent DE 199 06 548 C1 disclose elastic loops having a loss safety integrated in the basic body. This construction increases the production cost and does not allow for easily obtaining a two stage spring characteristic.

All parts of a motor vehicle are subject to a high cost pressure. The intension is to reduce the production cost of the parts and thus their contribution to the total cost of the motor vehicle as far as possible but without loosing performance of the parts.

Thus there is a need for an elastic loop for suspending the exhaust system of a motor vehicle at a vehicle floor of the motor vehicle, which can be produced at reduced cost without loosing performance.

SUMMARY OF THE INVENTION

In one aspect, the invention provides an elastic loop for suspending an exhaust system of a motor vehicle at a vehicle floor of the motor vehicle, the elastic loop having a basic body made of an elastomeric material, the basic body enclosing two receiving eyes, one of which being provided for receiving a supporting part, and the other of which being provided for receiving a part to be supported, and the basic body comprising at least two elastic supporting bands which run from the one receiving eye to the other receiving eye in a main plane of extension and operation of the loop, and a ring enclosing the basic body in the main plane, the ring being a pre-cut piece of a ribbon which is continuously woven in consecutive one-layer and two-layer areas, i.e. once in a single closed layer and once in two separate layers, the pre-cut piece including an entire two-layer area and at least parts of both adjacent one-layer areas.

Further, in a more detailed aspect, the invention provides an elastic loop for suspending an exhaust system of a motor vehicle at a vehicle floor of the motor vehicle, the elastic loop having a basic body made of an elastomeric material, the basic body enclosing two receiving eyes, one of which being provided for receiving a supporting part, and the other of which being provided for receiving a part to be supported, and the basic body having two outer supporting bands and two inner supporting bands which all run in a main plane of extension and operation of the loop from the one receiving eye to the other receiving eye, and a ring enclosing the basic body in the main plane, the ring being a pre-cut piece of a ribbon which is continuously woven in consecutive one-layer and two-layer areas, i.e. once in a single closed layer and once in two separate layers, the pre-cut piece including an entire two-layer area and at least parts of both adjacent one-layer areas, the ring having an inner circumference which is bigger than an outer circumference of the unloaded basic body, and the ring being held on the main body by protrusions which protrude from the basic body once on the one side of the ring and once on the other side of the ring at the outer circumference of the basic body.

In the new elastic loop the ring extending around the basic body of elastomeric material is a pre-cut piece of a ribbon which has been continuously woven in consecutive one-layer and two-layer areas, i.e. once in a single closed layer and once in two separate layers. The pre-cut piece of the ribbon includes a full two-layer area and at least parts of both adjacent one-layer areas. Thus, the circumference of the ring is defined by the lengths of the two layers of the two-layer area, each layer defining a half of the circumference, and the layers being held together by the adjacent one-layer areas. The two parts of the two adjacent one-layer areas may be provided at the inner or at the outer circumference of the ring and may protrude from it.

A ribbon having consecutive one-layer and two-layer areas can be produced by weaving techniques which are known as such. At least, with regard to its dimensions required here, such a ribbon is used in the technical field of motor vehicles for the first time. The dimensions relevant here typically range from 50 to 150 mm with regard to the length of the two-layer area corresponding to a circumference of the ring formed by this area from 100 to 300 mm; and the width of the ribbon usually is about 10 mm, i.e. typically at least 5 mm and 20 mm at maximum. Thus, as compared to the length of the two-layer area, the ribbon is comparatively narrow. So far as pre-cut pieces of ribbons with consecutive one-layer and two-layer areas have been used in the technical field of motor vehicles up to now, they have been used as connection means in which the width of the ribbon had the same order as the length of the two-layer area or in which the ribbon is even broader. I.e. even the width of the one-layer areas is much bigger in the prior art than here with the invention. Surprisingly, it has been found, that even with comparatively narrow ribbons, comparatively short parts of the adjacent one-layer areas of the ribbon are sufficient to tear-resistantly connect the two layers of the two-layer area of the band arranged in-between. This even applies with dynamic loads, as they typically occur in the use of the new elastic loop. Actually, a few millimeters of the one-layer areas at both ends of the pre-cut piece of the ribbon are sufficient for connecting the two layers of the two-layer area in a long lasting way so that the ring around the basic body remains closed even under high load. A typical length of the parts of both adjacent one-layer areas included in the pre-cut piece of the ribbon is about 5 mm, i.e. between 3 and 8 mm. Longer one-layer parts at both sides of the two-layer area are possible; however, they only increase the costs of the ribbon. The low costs are the particular advantage of the new elastic loop, as they are considerably lower as with a ribbon, the ends of which are sewn together. The loss safety of the new elastic loop is completely manufactured by wowing the ribbon and afterwards dividing up the woven ribbon in separate pre-cut pieces.

Polyester threads are a suitable material for making the ribbon. If these threads are cut hot in dividing up the ribbon into the pre-cut pieces, the threads at the cut edges melt together, and thus any dissolution of the woven structure of the ribbon starting at its cut edges is inhibited. However, with tightly woven ribbons this danger of dissolution of the woven structure is only small, if existing at all.

If the ring of the new elastic loop has an inner circumference which is bigger than the outer circumference of the unloaded basic body, the ring results in a two stage course of the spring characteristic of the elastic loop displaying a progressive slope as soon as the outer circumference of the basic body abuts against the inner circumference of the loss safety under load.

As long as the ring is still loosely arranged on the basic body, it can be held by protrusions of the basic body in a defined position with regard to the basic body. It is particularly preferred, if these protrusions are intermittingly provided on both sides of the loss safety at the outer circumference of the basic body.

In the new elastic loop, the basic body may have two inner supporting bands in addition to two outer supporting bands, which, like the outer supporting bands, run in the main plane of extension and operation of the loop between the receiving eyes. By these additional inner supporting bands an increased lateral stability normal to the plane of main extension is achieved, as compared to simple elastic loops having only one pair of supporting bands and similar spring properties within the main plane of the loop. This is due to the fact that the connection points of the inner supporting band to the receiving eyes are automatically closer together than the connection points of the outer supporting bands.

In this regard it is particularly preferred, if, within the main plane of the loop, a distance of each connection point of each inner supporting band to each receiving eye is smaller than any distance of any connection point of any outer supporting band to the same receiving eye.

With a similar course and with an at least not much stronger curvature or bending of the inner supporting bands, the construction defined above means that the inner supporting bands are shorter than the outer supporting bands.

If the inner supporting bands have a smaller effective cross section normal to the main plane of the loop than the outer supporting bands, the supporting bands have a particular small influence on the spring properties of the elastic loop within its main plane. However, even with such comparatively thin inner supporting bands, a considerable increase in lateral stability of the new elastic loop is achieved. In this context, the term effective cross section refers to the cross section of the supporting bands which provides for the formation of counter-forces to pulling loads applied to the supporting bands.

Preferably each of the inner supporting bands of the elastic loop approximately runs in parallel to one of the outer supporting bands. For example, the supporting bands may have a slight curvature in the unloaded state of the new elastic loop and may be pulled straight by the base load on the elastic loop. In this sense, it is preferred, if the inner supporting bands as well as the outer supporting bands have a straight shape.

In the sense of the present invention, the inner supporting bands are tuned to the outer supporting bands in an optimum way, if the inner supporting bands provide a smaller-counter force upon changes of the distance of the receiving eyes in the main plane of the loop than the outer supporting bands, but provide a higher counter-force upon movements of the receiving eyes normal to the main plane of the loop than the outer supporting bands.

In the new elastic loop, each receiving eye is to be formed in such a way that it receives a bolt of circular cross-section, for example, without any tilting play with regard to the main plane of the loop. Only if the receiving eyes receive the respective supporting part and the part to be supported without play, the high lateral stability of the new elastic loop can be exploited.

Suitable receiving eyes of the new elastic loop may have a circular or star-shaped free cross sectional area, for example. The star-shaped cross section may make it easier to introduce balls having extended heads at their tips or showing tolerances in diameter.

It is particularly preferred in the new elastic loop, if each of the receiving eyes is directly formed by the basic body of elastomeric material so that no additional materials are used beside the elastomeric material.

The basic body of the new elastic loop as such includes no reinforcing layer. This allows for making the supporting bands as simple pulling bands for tensional stress only. At the same time, doing without any reinforcement is a considerable cost advantage.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
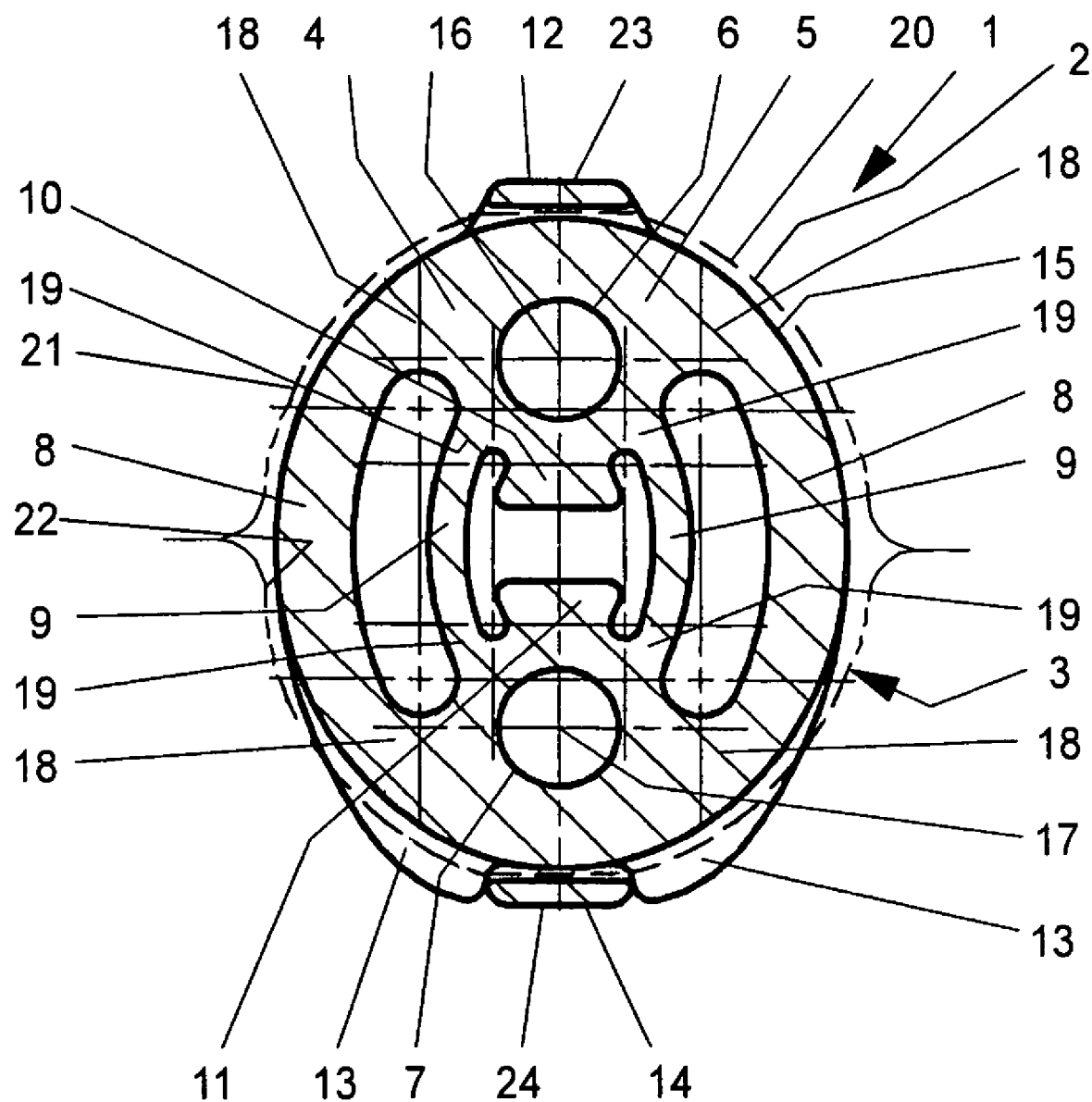
FIG. 1 is a cross section through a first embodiment example of the new elastic loop along its main plane of extension and operation, a ring made of a tear-resistant ribbon forming a loss safety being provided in a first embodiment.

Referring now in greater detail to the drawings, FIG. 1 illustrates an elastic loop 1 which consists of a loss safety 3 represented with a dashed line 2 and a single basic body 4 of elastomeric material 5. The basic body 4 displays the following details: two receiving eyes 6 and 7, two outer supporting bands 8, two inner supporting bands 9, stops 10 and 11, and protrusions 12 and 13 at its outer circumference. The receiving eyes 6 and 7 are arranged in parallel to each other and normal to the main plane of extension and intended operation of the elastic loop 1, which corresponds to the drawing plane, when swiveling axes 16 and 17 are considered which are defined by the receiving eyes 6 and 7. In operation, the elastic loop 1 may swivel about the swiveling axes 16 and 17 with regard to connection elements engaging the receiving eyes 6 and 7. The receiving eyes 6 and 7 are each provided for receiving a bolt of circular cross-section; the receiving eye 6 receives a bolt of a supporting part and the receiving eye 7 receives a bolt of a part to be supported. The supporting bands 8 and 9 connect the areas of the basic body 4 forming the receiving eyes 6 and 7. They serve for supporting loads acting between the receiving eyes 6 and 7. The supporting bands 8 are outer supporting bands, which are directly adjacent to the outer circumference 15 of the basic body 5. Like the outer supporting bands 8, the inner supporting bands 9 run from the receiving eye 6 to the receiving eye 7 in the main plane of the elastic loop 1. Each inner supporting band 9 has about the same curvature as its neighboring outer supporting band 8, i.e. it runs about in parallel to this outer supporting band 8. The slight curvatures of the supporting bands 8 and 9 in the unloaded state of the elastic loop 1 depicted in FIG. 1, however, mainly get lost, when the elastic loop 1 is built-in for suspending an exhaust system of a motor vehicle at a vehicle floor of the motor vehicle, and is thus subjected to a base load. Then, all supporting bands 8 and 9 are about straight and run in parallel to each other because of the base load. Within the plane of main extension of the elastic loop 1, connection points 18 of the outer supporting bands 8 to the receiving eyes 6 and 7 are both in the direction of the distance of the receiving eyes 6 and 7 and normal thereto farther away from the receiving eyes 6 and 7 than connection points 19 of the supporting bands 9. Correspondingly, the supporting bands 8 are clearly longer than the supporting bands 9. On the other hand, the supporting bands 8 have twice the cross section of the supporting bands 9, the cross sections being mainly constant over the entire lengths of the supporting bands. In total, the thinner inner supporting bands 9 have a smaller effect on the spring stiffness of the elastic loop 1 between the receiving eyes 6 and 7 than the thicker outer supporting bands 8. The lateral stability of the elastic loop 1, however, which is displayed as a stiffness between the receiving eyes 6 and 7 in a direction normal to the plane of main extension of the elastic loop 1, is relevantly increased by the supporting bands 9. This stiffness can indeed be mainly due to the supporting bands 9. The loss safety 3 made of a tear-resistant ribbon 20 extends around the outer circumference 15 of the basic body 4 as a closed ring 21, and has a bigger inner circumference 22 than the outer circumference 15, in the depicted unloaded state of the elastic loop 1. Upon loading the elastic loop 1 by increasing the distance of the receiving eyes 7, the outer supporting arms 8 are extended. Thus, the outer circumference 15 is increased until it is as big as the inner circumference 22 of the loss safety 3. Then, a further increase of the distance of the receiving eyes 6 and 7 is only possible under extension of the loss safety 3 which, however, is stiff in this direction, or under deformation of the basic body 4 in the area between the receiving eyes 6 and 7 and the loss safety 3. This results into a progressive increase of the spring characteristic of the elastic loop 1. The protrusions 1 to 14, which are protruding from the outer circumference 15 of the basic body 4 once on the one side and once on the other side of the loss safety 3 hold the loss safety 3 in its place around the outer circumference 15. Here, areas 23 and 24 of the protrusions 12 and 14 extending over the loss safety 3 care for the loss safety 3 not falling off the basic body 4 even in the unloaded state of the elastic loop 1. The stops 10 and 11 delimit a movement of the receiving eyes 6 and 7 towards each other which may occur under dynamic load. The stops 10 and 11 made of elastomeric material 5 care for braking down this movement of the receiving eyes 6 and 7 in a controlled way. In the manufacture of the new elastic loop 1, the basic body 4 is made in one step of the elastomeric material 5 injected into a mould. Afterwards, only the loss safety 3 which is closed like a ring is arranged on the outer circumference 15 of the basic body 4.

Figure 2:
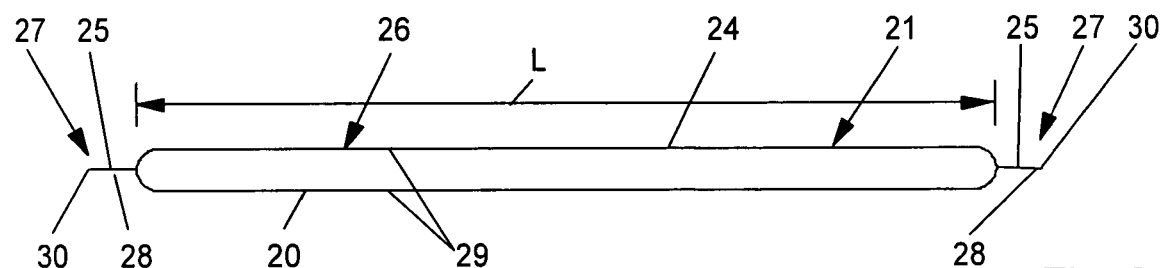
FIG. 2 is a separate side view on the ring of tear-resistant ribbon according to FIG. 1.
Figure 3:
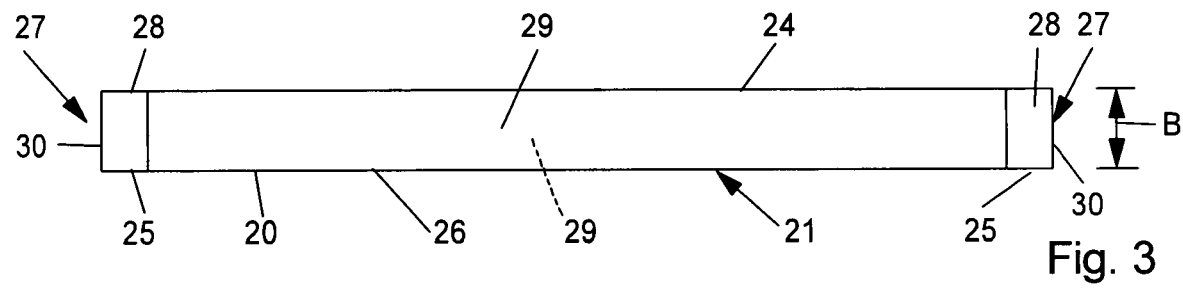
FIG. 3 is a top view on the ring according to FIG. 2.

In FIGS. 2 and 3 the ring 21 of the loss safety 3 according FIG. 1 is separately depicted in two views. Actually, the ring 21 is a pre-cut piece 24 of a tear-resistant band 20, which is woven in consecutive one-layer areas 25 and two-layer areas 26, i.e. once in a single closed layer 28 and once in two separate layers 29 running in parallel to each other. The pre-cut piece 24 includes an entire area 26 and parts of the adjacent areas 25. Actually, a half area 25 can be provided on each side of the area 26 in the pre-cut piece 24. To this end, the tear-resistant band, which has been woven of polyester threads 4, can be hot-cut into single pre-cut pieces 24 so that the cut edges 30 are sealed by melting the single threads together. By means of the parts of the areas 25 at both ends of the pre-cut piece 24 the layers 29 are connected to each other in a long lasting way. This connection does not get lost even under high dynamic loads onto the elastic loop according to FIG. 1. In the present embodiment the length L of the area 26 is 100 mm, which corresponds to an inner circumference of the ring 21 of 200 mm. The parts of the areas 25 on both sides of the area 26 in the pre-cut piece 24 are each 5 mm long. The width B of the ribbon 20 is 10 mm.

Figure 4:
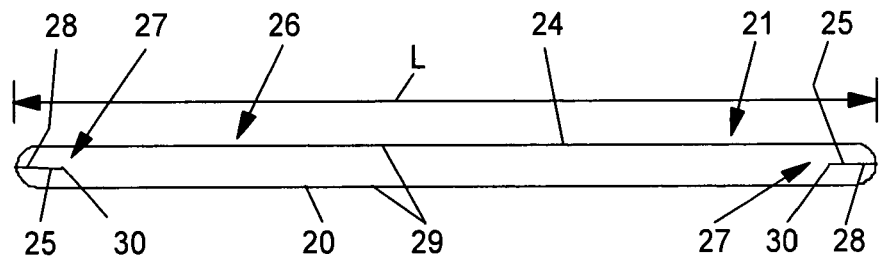
FIG. 4 is a separate side view on a second embodiment of the ring made of tear-resistant ribbon.

In principle, these figures also apply to the ring 21 depicted in FIG. 4. This ring 21 differs from the ring 21 shown in FIGS. 2 and 3 only in that the layers 29 of the area 26 are turned inside-out so that the parts of the areas 25 are now pointing inwards, i.e. protrude from the inner circumference of the ring 21, whereas they protrude from the outer circumference of the ring 21 according to FIGS. 2 and 3. This, however, does not affect the general function of the ring 21 in the elastic loop 1 according to FIG. 1. Provided with the ring 21 according to FIG. 4, however, the new elastic loop 1 has a more conventional appearance.

It is also considered to use the parts of the areas 25 at the ends 27 of the pre-cut pieces 24 for securing the ring 21, i.e. the loss safety 3, to the basic body 4.

Figure 5:
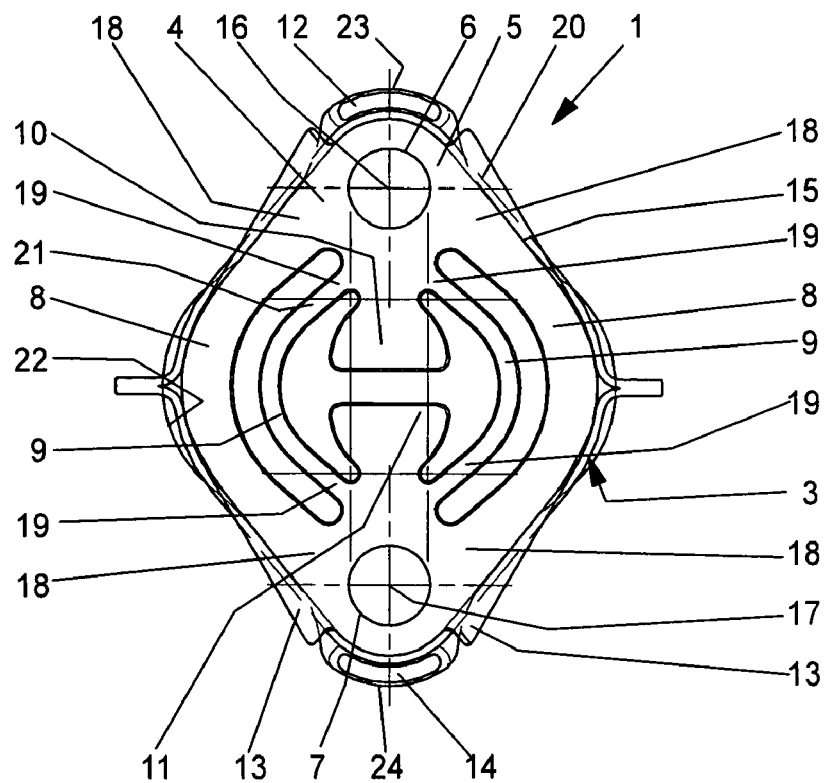
FIG. 5 is a side view on a second embodiment example of the new elastic loop normal to its main plane of extension and operation.

FIG. 5 shows a further embodiment example of the new elastic loop 1. Here, the supporting bands 8 and 9 have a stronger curvature than in the first embodiment according to FIG. 1. Additionally, the whole elastic loop has a more rhombus-shaped circumference, as the curvature of the outer supporting bands 8 is concentrated to their middle region. This allows for covering a greater increase of the distance between the swiveling axes 16 and 17 by a deformation instead of an elongation of the supporting bands 8. As in the first embodiment according to FIG. 1, the inner supporting bands 9 of the elastic loop 1 according to FIG. 5 predominantly increase the lateral stability of the elastic loop 1 and only have a very little influence on its spring characteristic with regard to the distance between the swiveling axes 16 and 17. Here, however, their connection points 19 to the receiving eyes 6 and 7 are further away from the receiving eyes 6 and 7 than the connection points 18 of the outer supporting bands, but the two connection points 19 at the ends of each inner supporting band 9 are much closer together in the direction of the distance of the swiveling axes 16 and 17 than the two connection points 18 of each the outer supporting band 8. The ring 21 of the elastic loop 1 is in the same embodiment as the ring 21 of previous FIGS. 1 to 3.

Figure 6:
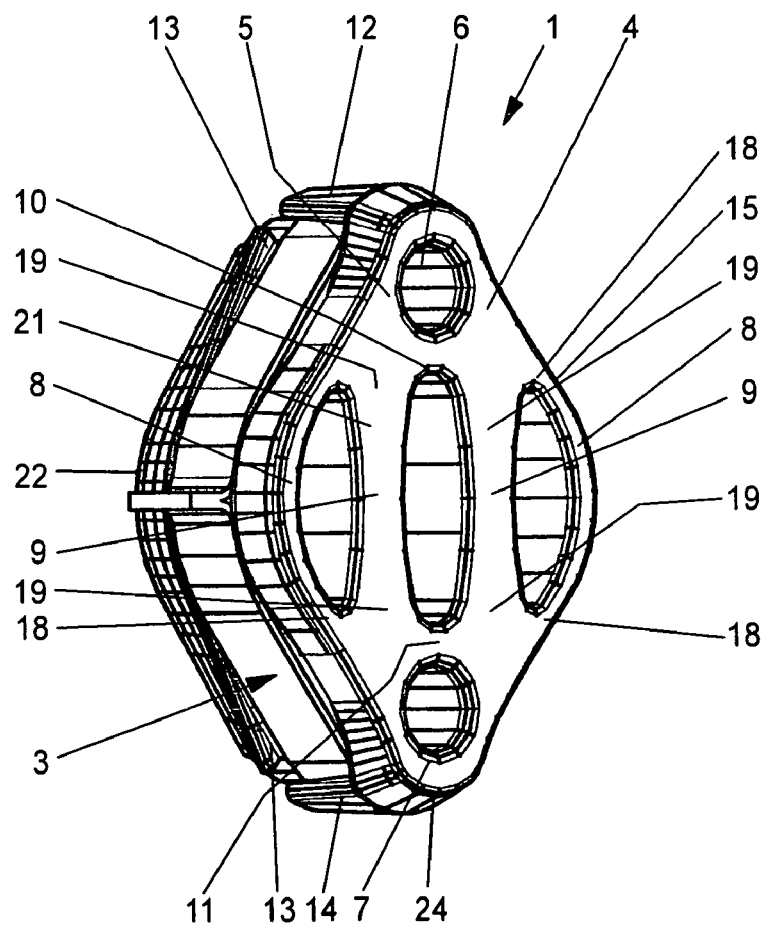
FIG. 6 is a perspective view on a third embodiment example of the new elastic loop.

The embodiment example of the elastic loop depicted in FIG. 6 differs from the previous embodiments in that the inner supporting bands 9 have a much stronger cross section than the outer supporting bands. Thus, they are providing the main component of the spring characteristic of the elastic loop 1 with regard to the distance between the swiveling axes 16 and 17. Further, these inner supporting bands 9 do only show a very little curvature considering their extension between the swiveling axes 16 and 17. They have nearly no curvature between their connection points 19 to the receiving eyes 6 and 7. Vice versa, the outer supporting bands 8 are here mainly provided for increasing the lateral stability of the elastic loop 1. Further, the outer supporting bands 9 of smaller cross section have the effect, that the second stage of the spring characteristic of the elastic loop 1 starting upon the outer circumference 15 of the basic body 4 equaling the inner circumference of the 21 has a smaller slope. This is due to the smaller deformation resistance of the thinner outer supporting bands 9. Because of the stronger and nearly straight inner supporting bands 9 no stops 10 and 11 are necessary in the embodiment of the elastic loop 1 according to FIG. 6.

Many variations and modifications may be made to the preferred embodiments of the invention without departing substantially from the spirit and principles of the invention. All such modifications and variations are intended to be included herein within the scope of the present invention, as defined by the following claims.

LIST OF REFERENCE NUMERALS 1 elastic loop
2 dashed line
3 loss safety
4 basic body
5 elastomeric material
6 receiving eye
7 receiving eye
8 supporting band
9 supporting band
10 stop
11 stop
12 protrusion
13 protrusion
14 protrusion
15 outer circumference
16 swivelling axis
17 swivelling axis
18 connection point
19 connection point
20 tear-resistant ribbon
21 ring
22 inner circumference
23 projection
24 pre-cut piece
25 one-layer area
26 two-layer area
27 end
28 layer
29 layer
30 cut edge

We claim:

1. An elastic loop for suspending an exhaust system of a motor vehicle at a vehicle floor of the motor vehicle, the elastic loop having
a basic body made of an elastomeric material, the basic body enclosing two receiving eyes, one of which being provided for receiving a supporting part, and the other of which being provided for receiving a part to be supported, and the basic body comprising at least two elastic supporting bands which run from the one receiving eye to the other receiving eye in a main plane of extension and operation of the loop, and
a ring enclosing the basic body in the main plane, the ring comprising two ribbons woven of threads, the two ribbons being connected at both of their ends to form the ring by connecting areas protruding from the ring, in which the threads of the ribbons are interwoven.

2. The elastic loop according to claim 1, wherein the ribbons are woven of polyester threads.

3. The elastic loop according to claim 2, wherein the interwoven threads are molten together at free ends of the protruding connecting areas.

4. The elastic loop of claim 1, wherein the ring has an inner circumference which is bigger than an outer circumference of the unloaded basic body.

5. The elastic loop according to claim 4, wherein the ring is held on the main body by protrusions protruding from the basic body.

6. The elastic loop according to claim 5, wherein the protrusions are once provided on the one side of the ring and once provided on the other side of the ring at the outer circumference of the basic body.

7. The elastic loop according to claim 1, wherein the basic body has two outer and two inner supporting bands which all run in the main plane of the loop between the one receiving eye to the other receiving eye.

8. The elastic loop according to claim 7, wherein each receiving eye receives a bolt of circular cross-section without swiveling play with regard to the main plane.

9. An elastic loop for suspending an exhaust system of a motor vehicle at a vehicle floor of the motor vehicle, the elastic loop having
a basic body made of an elastomeric material,
the basic body enclosing two receiving eyes, one of which being provided for receiving a supporting part, and the other of which being provided for receiving a part to be supported, and
the basic body having two outer supporting bands and two inner supporting bands which all run in a main plane of extension and operation of the loop from the one receiving eye to the other receiving eye, and
a ring enclosing the basic body in the main plane,
the ring comprising two ribbons woven of threads, the two ribbons being connected at both of their ends to form the ring by connecting areas protruding from the ring, in which the threads of the ribbons are interwoven,
the ring having an inner circumference which is bigger than an outer circumference of the unloaded basic body, and
the ring being held on the basic body by protrusions which protrude from the basic body once on the one side of the ring and once on the other side of the ring at the outer circumference of the basic body.

10. The elastic loop according to claim 9, wherein the ribbon is woven of polyester threads, and wherein the ends of the pre-cut piece are hot cut.

* * * * *